(12) United States Patent
Galil et al.

(10) Patent No.: US 12,554,581 B2
(45) Date of Patent: Feb. 17, 2026

(54) MULTI-PART COMPARE AND EXCHANGE OPERATION

(71) Applicant: Mobileye Vision Technologies Ltd., Jerusalem (IL)

(72) Inventors: Eran Galil, Ramat Yishai (IL); Boaz Ouriel, Zichron Ya'akov (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 0 days.

(21) Appl. No.: 17/915,821

(22) PCT Filed: Apr. 1, 2021

(86) PCT No.: PCT/IB2021/000214
§ 371 (c)(1),
(2) Date: Sep. 29, 2022

(87) PCT Pub. No.: WO2021/198784
PCT Pub. Date: Oct. 7, 2021

(65) Prior Publication Data
US 2023/0116945 A1  Apr. 20, 2023

Related U.S. Application Data

(60) Provisional application No. 63/004,735, filed on Apr. 3, 2020.

(51) Int. Cl.
G06F 11/00 (2006.01)
G06F 9/30 (2018.01)
G06F 9/38 (2018.01)
G06F 11/14 (2006.01)

(52) U.S. Cl.
CPC ......... *G06F 11/141* (2013.01); *G06F 9/3004* (2013.01); *G06F 9/30072* (2013.01); *G06F 9/3851* (2013.01)

(58) Field of Classification Search
CPC ... G06F 11/141; G06F 9/3004; G06F 9/30072
See application file for complete search history.

(56) References Cited

U.S. PATENT DOCUMENTS 5,742,785 A     4/1998  Stone et al.
5,892,944 A  *  4/1999  Fukumoto ............... G06F 9/468
                                                          718/103

(Continued)

FOREIGN PATENT DOCUMENTS

CN      115668137          1/2023
EP        1873640 A2       1/2008
WO  WO-2021198784 A1      10/2021

OTHER PUBLICATIONS

"International Application Serial No. PCT/IB2021/000214, International Search Report mailed Sep. 22, 2021", 4 pgs.

(Continued)

*Primary Examiner* — Loan L.T. Truong
(74) *Attorney, Agent, or Firm* — Schwegman Lundberg & Woessner, P.A.

(57) ABSTRACT

A method for executing an atomic compare and exchange operation, the method may include processing a compare command and a conditional exchange command while considering hardware failures.

22 Claims, 5 Drawing Sheets

(56) References Cited

U.S. PATENT DOCUMENTS

| | | | | |
|---|---|---|---|---|
| 6,101,329 | A * | 8/2000 | Graef | G06F 5/14 |
| | | | | 710/52 |
| 6,466,825 | B1 * | 10/2002 | Wang | G06F 12/0822 |
| | | | | 711/E12.028 |
| 10,013,173 | B2 * | 7/2018 | More | G06F 13/4286 |
| 2002/0078307 | A1 | 6/2002 | Zahir | |
| 2004/0162989 | A1 * | 8/2004 | Kirovski | G06F 21/64 |
| | | | | 713/189 |
| 2004/0236914 | A1 * | 11/2004 | Day | G06F 9/3004 |
| | | | | 710/22 |
| 2005/0050307 | A1 * | 3/2005 | Reinhardt | G06F 9/3863 |
| | | | | 712/E9.061 |
| 2006/0242402 | A1 * | 10/2006 | Swift | G06F 11/1482 |
| | | | | 713/2 |
| 2012/0203805 | A1 * | 8/2012 | Lee | G06F 16/2358 |
| | | | | 707/822 |
| 2016/0057038 | A1 * | 2/2016 | Watanabe | H04L 43/0847 |
| | | | | 370/244 |
| 2016/0062899 | A1 * | 3/2016 | Cain, III | G06F 9/4843 |
| | | | | 711/125 |
| 2017/0039144 | A1 * | 2/2017 | Wang | G06F 12/126 |
| 2018/0300846 | A1 * | 10/2018 | Ray | G06T 1/60 |
| 2019/0205244 | A1 * | 7/2019 | Smith | G06F 3/065 |
| 2019/0235933 | A1 * | 8/2019 | Levandoski | G06F 9/30043 |
| 2020/0034284 | A1 * | 1/2020 | Solan | G06F 9/45541 |
| 2020/0057731 | A1 * | 2/2020 | Kimura | G06F 9/5016 |
| 2020/0310684 | A1 * | 10/2020 | Fowler | G06F 3/0659 |
| 2023/0004346 | A1 * | 1/2023 | Liljedahl | G06F 9/30094 |

OTHER PUBLICATIONS

"International Application Serial No. PCT/IB2021/000214, Written Opinion mailed Sep. 22, 2021", 5 pgs.

"Chinese Application Serial No. 202180039900.5 ,Response Filed Sep. 5, 2023 To Office Action mailed Aug. 8, 2023", W/ English Claims, 95 pgs.

"European Application Serial No. 21725982.9, Communication Pursuant to Article 94(3) EPC mailed Nov. 15, 2023", 4 pgs.

"International Application Serial No. PCT IB2021 000214, International Preliminary Report on Patentability mailed Oct. 13, 2022", 7 pgs.

"European Application Serial No. 21725982.9, Response to Communication Pursuant to Rules 161 and 162 EPC filed Apr. 20, 2023", 10 pgs.

"European Application Serial No. 21725982.9, Response filed Mar. 15, 2024 to Communication Pursuant to Article 94(3) EPC mailed Nov. 15, 2023", 38 pgs.

* cited by examiner

MULTI-PART COMPARE AND EXCHANGE OPERATION

CLAIM TO PRIORITY

This patent application claims the benefit of priority to U.S. Provisional Patent Application Ser. No. 63/004,735, filed on Apr. 3, 2020, which is incorporated herein by reference in its entirety.

BACKGROUND

Advanced driver assistance systems (ADAS), and autonomous vehicle (AV) systems use cameras and other sensors together with object classifiers, which are designed to detect specific objects in an environment of a vehicle navigating a road. Object classifiers are designed to detect predefined objects and are used within ADAS and AV systems to control the vehicle or alert a driver based on the type of object that is detected its location, etc.

As ADAS and AV systems progress towards fully autonomous operation, it would be beneficial to protect data generated by these systems.

SUMMARY

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples.

Disclosed embodiments provide systems and methods that can be used as part of or in combination with autonomous navigation/driving and/or driver assist technology features. Driver assist technology refers to any suitable technology to assist drivers in the navigation and/or control of their vehicles, such as forward-collision warning (FCW), lane departure warning (LDW) and traffic sign recognition (TSR), as opposed to fully autonomous driving. In various embodiments, the system may include one, two or more cameras mountable in a vehicle and an associated processor that monitor the environment of the vehicle. In further embodiments, additional types of sensors can be mounted in the vehicle ad can be used in the autonomous navigation and/or driver assist system. In some examples of the presently disclosed subject matter, the system may provide techniques for processing images of an environment ahead of a vehicle navigating a road for training a neural networks or deep learning algorithms to estimate a future path of a vehicle based on images. In yet further examples of the presently disclosed subject matter, the system may provide techniques for processing images of an environment ahead of a vehicle navigating a road using a trained neural network to estimate a future path of the vehicle.

There are provided systems, methods, as illustrated in the claims and the specification.

Any combination of any subject matter of any claim may be provided.

Any combination of any method and/or method step disclosed in any figure and/or in the specification may be provided.

Any combination of any unit, device, and/or component disclosed in any figure and/or in the specification may be provided. Non-limiting examples of such units include a gather unit, an image processor, and the like.

There may be provided a method for executing an atomic compare exchange operation, the method may include (i) receiving, from a processing core, a compare command, the compare command that may be for (a) comparing an expected value to a stored value, the stored value may be stored in a memory location, and (b) outputting a comparison result that indicates whether the stored value equals the expected value, wherein the compare command may be associated with a conditional exchange command, wherein the compare command and the conditional exchange command are associated with a same thread; (ii) determining, by a first controller, whether an execution of the compare command causes a hardware failure; (iii) when determining that the execution of the compare command does not cause the hardware failure then executing the compare command and the conditional exchange command in an atomic manner; (iv) when determining that the execution of the compare result causes the hardware failure then (a) generating a comparison result that indicates that the stored value differs from an expected value; and (b) executing the conditional exchange command based on an assumption that the stored value differs from an expected value, wherein the executing of the conditional exchange command may include outputting the stored value, the stored value reflects a content of the memory location before the execution of the conditional exchange command; (v) receiving, by the processing core, the stored value; and (iv) evaluating, by the processing core, whether the hardware failure occurred based on a comparison between the stored value and the expected value.

When determining that the execution of the compare command does not cause the hardware failure then executing the conditional exchange command in an atomic manner by an atomic execution arithmetic logic circuit (ALU).

When determining that the execution of the compare result causes the hardware failure then executing the conditional exchange command without involving the atomic execution ALU.

When determining that the execution of the compare result causes the hardware failure, then the outputting of the stored value may be preceded by executing the conditional exchange command by the atomic execution ALU.

The method may include executing the conditional exchange command by an atomic execution arithmetic logic circuit (ALU), wherein the determining comprises checking whether the compare command can be stored in a buffer allocated to the atomic execution ALU.

The method may include determining that the hardware failure occurred when the (a) stored value equals a desired value, and (b) the comparison result indicates that the stored value differs from an expected value.

The method may include sending the compare command and the conditional exchange command to the atomic execution ALU when determining that the hardware failure did not occur, without sending any other command to be executed between an execution of the compare command and an execution of the conditional exchange command.

The method may include sending the conditional exchange command to the atomic execution ALU, without sending the compare command when determining that the hardware failure did occur.

The method may include sending only a conditional exchange command to the atomic execution ALU when the hardware failure occurred and sending to the atomic execution ALU a compare command and an associated conditional exchange command when the hardware failure did not occur.

The method may include performing at least one more iteration of an execution of the atomic compare exchange operation, following an evaluating that the hardware failure occurred.

The memory location may belong to a cache memory.

There may be provided a device that may include an atomic execution algorithm logic unit (ALU), a processing core, and a first controller; wherein the processing core is configured to send to the first controller a compare command, the compare command is for (a) comparing an expected value to a stored value, the stored value is stored in a memory location, and (b) outputting a comparison result that indicates whether the stored value equals the expected value, wherein the compare command is associated with a conditional exchange command, wherein the compare command and the conditional exchange command are associated with a same thread; wherein the first controller is configured to determine whether an execution of the compare command causes a hardware failure; when determining that the execution of the compare command does not cause the hardware failure then the atomic execution ALU is configured to receive and execute the compare command and the conditional exchange command in an atomic manner; when determining that the execution of the compare result causes the hardware failure then: (a) the first controller is configured to generate a comparison result that indicates that the stored value differs from an expected value; (b) the atomic execution ALU may be configured to execute the conditional exchange command based on an assumption that the stored value differs from an expected value, wherein the executing of the conditional exchange command may include outputting the stored value, the stored value reflects a content of the memory location before the execution of the conditional exchange command; and (c) processing core may be configured to receive the stored value, and evaluate whether the hardware failure occurred based on a comparison between the stored value and the expected value.

The atomic execution ALU may be configured to execute the compare command following a determination that the execution of the compare command does not cause the hardware failure.

The first controller may be configured to execute the conditional exchange command without using the atomic execution ALU when determining that the execution of the compare result causes the hardware failure.

The atomic execution ALU may be configured to execute the compare command based on an assumption that the stored value differs from the expected value when determining that the execution of the compare result causes the hardware failure.

The device may include executing the conditional exchange command by the atomic execution ALU, wherein the first controller may be configured to perform the determining by checking whether the compare command can be stored in a buffer allocated to the atomic execution ALU.

The processing core may be configured to determine that the hardware failure occurred when the (a) stored value equals a desired value, and (b) the comparison result indicates that the stored value differs from an expected value.

The first controller may be configured to send the compare command and the conditional exchange command to the atomic execution ALU when determining that the hardware failure did not occur, without sending any other command to be executed between an execution of the compare command and an execution of the conditional exchange command.

The first controller may be configured to send the conditional exchange command to the atomic execution ALU, without sending the compare command when determining that the hardware failure did occur.

The first controller may be configured to send only a conditional exchange command to the atomic execution ALU when the hardware failure occurred and to send to the atomic execution ALU a compare command and an associated conditional exchange command when the hardware failure did not occur.

The device wherein the device may be configured to perform at least one more iteration of an execution of the atomic compare exchange operation, following an evaluating that the hardware failure occurred.

The memory location belongs to a cache memory.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
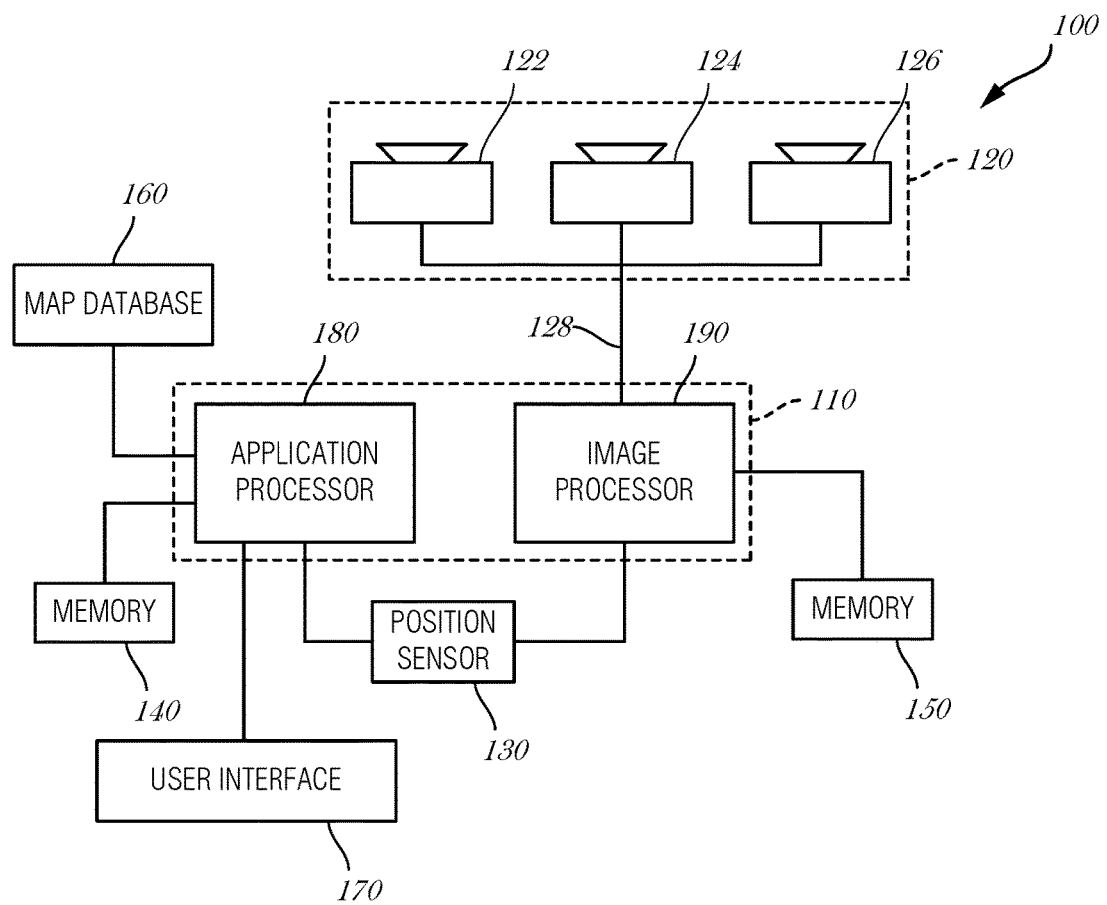
FIG. 1 is a block diagram representation of a system consistent with the disclosed embodiments.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system and any other component should be applied mutatis mutandis to a method that may be executed by the memory device and should be applied mutatis mutandis to a non-transitory computer readable medium that stores instructions that may be executed by the memory device. For example, there may be provided a method and/or method steps executed by the image processor described in any one of claims. For example, there may be provided a method and/or method steps executed by the image processor described in any one of claims.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Any combination of any module or unit listed in any of the figures, any part of the specification and/or any claims may be provided. Especially any combination of any claimed feature may be provided.

A pixel may be a picture element obtained by a camera or may be a processed picture element.

Before discussing in detail examples of features of the processing images of an environment ahead of a vehicle navigating a road for training a neural networks or deep learning algorithms to estimate a future path of a vehicle based on images or feature of the processing of images of an environment ahead of a vehicle navigating a road using a trained neural network to estimate a future path of the vehicle, there is provided a description of various possible implementations and configurations of a vehicle mountable system that can be used for carrying out and implementing the methods according to examples of the presently disclosed subject matter. In some embodiments, various examples of the system can be mounted in a vehicle and can be operated while the vehicle is in motion. In some embodiments, the system can implement the methods according to examples of the presently disclosed subject matter.

However, it would be appreciated that embodiments of the present disclosure are not limited to scenarios where a suspected upright object indication is caused by a high-grade road. The suspected upright object indication can be associated with various other circumstances and can result from other types of image data and also from data that is not image-based or is not exclusively image-based, as well.

FIG. 1, to which reference is now made, is a block diagram representation of a system consistent with the disclosed embodiments. System 100 can include various components depending on the requirements of a particular implementation. In some examples, system 100 can include a processing unit 110, an image acquisition unit 120 and one or more memory units 140, 150. Processing unit 110 can include one or more processing devices. In some embodiments, processing unit 110 can include an application processor 180, an image processor 190, or any other suitable processing device. Similarly, image acquisition unit 120 can include any number of image acquisition units and components depending on the requirements of a particular application. In some embodiments, image acquisition unit 120 can include one or more image capture devices (e.g., cameras), such as image capture device 122, image capture device 124, and image capture device 126. In some embodiments, system 100 can also include a data interface 128 communicatively connecting processing unit 110 to image acquisition unit 120. For example, data interface 128 can include any wired and/or wireless link or links for transmitting image data acquired by image acquisition unit 120 to processing unit 110.

Both application processor 180 and image processor 190 can include various types of processing devices. For example, either or both of application processor 180 and image processor 190 can include one or more microprocessors, preprocessors (such as image preprocessors), graphics processors, central processing units (CPUs), support circuits, digital signal processors, integrated circuits, memory, or any other types of devices suitable for running applications and for image processing and analysis. In some embodiments, application processor 180 and/or image processor 190 can include any type of single or multi-core processor, mobile device microcontroller, central processing unit, etc. Various processing devices can be used, including, for example, processors available from manufacturers such as Intel®, AMD®, etc. and can include various architectures (e.g., x86 processor, ARM®, etc.).

In some embodiments, application processor 180 and/or image processor 190 can include any of the EyeQ series of processor chips available from Mobileye®. These processor designs each include multiple processing units with local memory and instruction sets. Such processors may include video inputs for receiving image data from multiple image sensors and may also include video out capabilities. In one example, the EyeQ2® uses 90 nm-micron technology operating at 332 Mhz. The EyeQ2® architecture has two floating point, hyper-thread 32-bit RISC CPUs (MIPS32® 34K® cores), five Vision Computing Engines (VCE), three Vector Microcode Processors (VMP®), Denali 64-bit Mobile DDR Controller, 128-bit internal Sonics Interconnect, dual 16-bit Video input and 18-bit Video output controllers, 16 channels DMA and several peripherals. The MIPS34K CPU manages the five VCEs, three VMP™ and the DMA, the second MIPS34K CPU and the multi-channel DMA as well as the other peripherals. The five VCEs, three VMP® and the MIPS34K CPU can perform intensive vision computations required by multi-function bundle applications. In another example, the EyeQ3®, which is a third-generation processor and is six times more powerful that the EyeQ2®, may be used in the disclosed examples. In yet another example, the EyeQ4®, the fourth-generation processor, may be used in the disclosed examples.

While FIG. 1 depicts two separate processing devices included in processing unit 110, more or fewer processing devices can be used. For example, in some examples, a single processing device may be used to accomplish the tasks of application processor 180 and image processor 190. In other embodiments, these tasks can be performed by more than two processing devices.

Processing unit 110 can include various types of devices. For example, processing unit 110 may include various devices, such as a controller, an image preprocessor, a central processing unit (CPU), support circuits, digital signal processors, integrated circuits, memory, or any other types of devices for image processing and analysis. The image preprocessor can include a video processor for capturing, digitizing, and processing the imagery from the image sensors. The CPU can include any number of microcontrollers or microprocessors. The support circuits can be any number of circuits generally well known in the art, including cache, power supply, clock, and input-output circuits. The memory can store software that, when executed by the processor, controls the operation of the system. The memory can include databases and image processing software, including a trained system, such as a neural network, for example. The memory can include any number of random access memories, read only memories, flash memories, disk drives, optical storage, removable storage, and other types of storage. In one instance, the memory can be separate from the processing unit 110. In another instance, the memory can be integrated into the processing unit 110.

Each memory 140, 150 can include software instructions that when executed by a processor (e.g., application processor 180 and/or image processor 190), can control operation of various aspects of system 100. These memory units can include various databases and image processing software. The memory units can include random access memory, read only memory, flash memory, disk drives, optical storage, tape storage, removable storage, and/or any other types of storage. In some examples, memory units 140, 150 can be separate from the application processor 180 and/or image processor 190. In other embodiments, these memory units can be integrated into application processor 180 and/or image processor 190.

In some embodiments, the system can include a position sensor 130. The position sensor 130 can include any type of device suitable for determining a location associated with at least one component of system 100. In some embodiments, position sensor 130 can include a GPS receiver. Such receivers can determine a user position and velocity by processing signals broadcasted by global positioning system satellites. Position information from position sensor 130 can be made available to application processor 180 and/or image processor 190.

In some embodiments, the system 100 can be operatively connectible to various systems, devices, and units onboard a vehicle in which the system 100 can be mounted, and through any suitable interfaces (e.g., a communication bus) the system 100 can communicate with the vehicle's systems. Examples of vehicle systems with which the system 100 can cooperate include: a throttling system, a braking system, and a steering system.

In some embodiments, the system 100 can include a user interface 170. User interface 170 can include any device suitable for providing information to or for receiving inputs from one or more users of system 100, including, for example, a touchscreen, microphone, keyboard, pointer devices, track wheels, cameras, knobs, buttons, etc. Information can be provided by the system 100, through the user interface 170, to the user.

In some embodiments, the system 100 can include a map database 160. The map database 160 can include any type of database for storing digital map data. In some examples, map database 160 can include data relating to a position, in a reference coordinate system, of various items, including roads, water features, geographic features, points of interest, etc. Map database 160 can store not only the locations of such items, but also descriptors relating to those items, including, for example, names associated with any of the stored features and other information about them. For example, locations and types of known obstacles can be included in the database, information about a topography of a road or a grade of certain points along a road, etc. In some embodiments, map database 160 can be physically located with other components of system 100. Alternatively, or additionally, map database 160 or a portion thereof can be located remotely with respect to other components of system 100 (e.g., processing unit 110). In such embodiments, information from map database 160 can be downloaded over a wired or wireless data connection to a network (e.g., over a cellular network and/or the Internet, etc.).

Image capture devices 122, 124, and 126 can each include any type of device suitable for capturing at least one image from an environment. Moreover, any number of image capture devices can be used to acquire images for input to the image processor. Some examples of the presently disclosed subject matter can include or can be implemented with only a single-image capture device, while other examples can include or can be implemented with two, three, or even four or more image capture devices. Image capture devices 122, 124, and 126 will be further described with reference to FIGS. 2A-2E, below.

It would be appreciated that the system 100 can include or can be operatively associated with other types of sensors, including for example: an acoustic sensor, a RF sensor (e.g., radar transceiver), a LIDAR sensor. Such sensors can be used independently of or in cooperation with the image acquisition unit 120. For example, the data from the radar system (not shown) can be used for validating the processed information that is received from processing images acquired by the image acquisition unit 120, e.g., to filter certain false positives resulting from processing images acquired by the image acquisition unit 120, or it can be combined with or otherwise compliment the image data from the image acquisition unit 120, or some processed variation or derivative of the image data from the image acquisition unit 120.

Figure 2A:
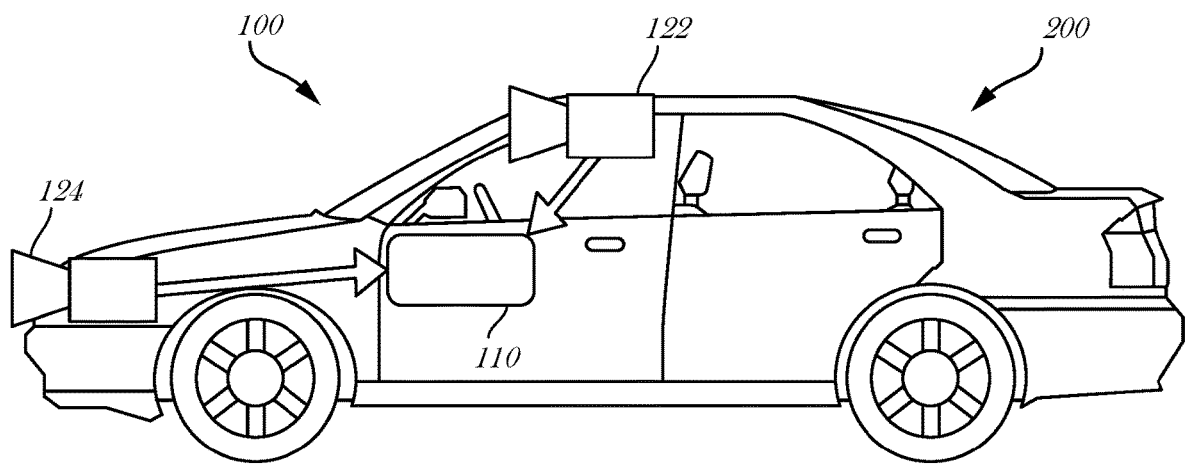
FIG. 2A is a diagrammatic side view representation of an exemplary vehicle including a system consistent with the disclosed embodiments.

System 100, or various components thereof, can be incorporated into various different platforms. In some embodiments, system 100 may be included on a vehicle 200, as shown in FIG. 2A. For example, vehicle 200 can be equipped with a processing unit 110 and any of the other components of system 100, as described above relative to FIG. 1. While in some embodiments vehicle 200 can be equipped with only a single-image capture device (e.g., camera), in other embodiments, such as those discussed in connection with FIGS. 2A-2E, multiple image capture devices can be used. For example, either of image capture devices 122 and 124 of vehicle 200, as shown in FIG. 2A, can be part of an ADAS (Advanced Driver Assistance Systems) imaging set.

The image capture devices included on vehicle 200 as part of the image acquisition unit 120 can be positioned at any suitable location. In some embodiments, as shown in FIGS. 2A-2E and 3, image capture device 122 can be located in the vicinity of the rearview mirror. This position may provide a line of sight similar to that of the driver of vehicle 200, which can aid in determining what is and is not visible to the driver.

Other locations for the image capture devices of image acquisition unit 120 can also be used. For example, image capture device 124 can be located on or in a bumper of vehicle 200. Such a location can be especially suitable for image capture devices having a wide field of view. The line of sight of bumper-located image capture devices can be different from that of the driver. The image capture devices (e.g., image capture devices 122, 124, and 126) can also be located in other locations. For example, the image capture devices may be located on or in one or both of the side mirrors of vehicle 200, on the roof of vehicle 200, on the hood of vehicle 200, on the trunk of vehicle 200, on the sides of vehicle 200, mounted on, positioned behind, or positioned in front of any of the windows of vehicle 200, and mounted in or near light figures on the front and/or back of vehicle 200, etc. The image acquisition unit 120, or an image capture device that is one of a plurality of image capture devices that are used in an image acquisition unit 120, can have a field-of-view (FOV) that is different than the FOV of a driver of a vehicle, and not always see the same objects. In one example, the FOV of the image acquisition unit 120 can extend beyond the FOV of a typical driver and can thus image objects which are outside the FOV of the driver. In yet another example, the FOV of the image acquisition unit 120 is some portion of the FOV of the driver. In some embodiments, the FOV of the image acquisition unit 120 corresponding to a sector which covers an area of a road ahead of a vehicle and possibly also surroundings of the road.

In addition to image capture devices, vehicle 200 can be include various other components of system 100. For example, processing unit 110 may be included on vehicle 200 either integrated with or separate from an engine control unit (ECU) of the vehicle. Vehicle 200 may also be equipped with a position sensor 130, such as a GPS receiver and may also include a map database 160 and memory units 140 and 150.

Figure 2B:
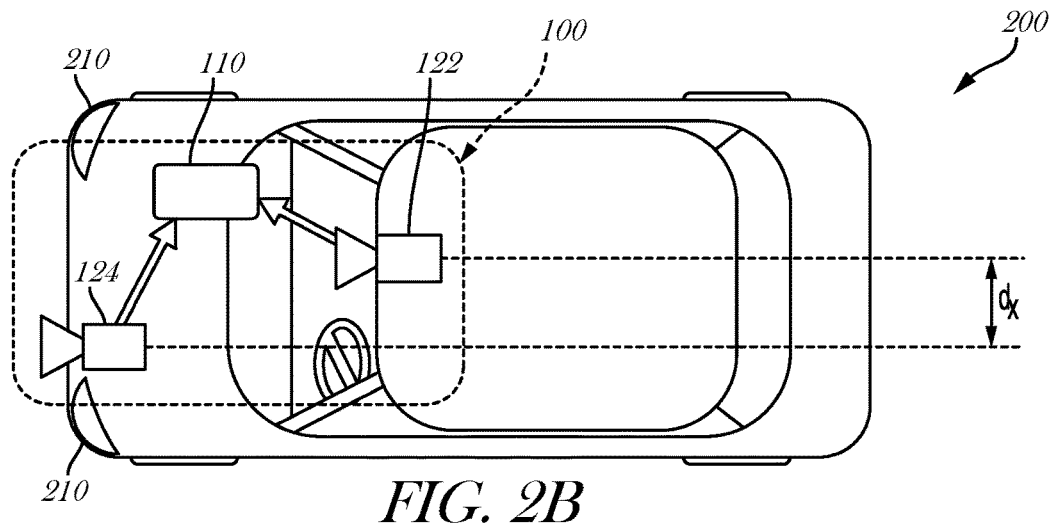
FIG. 2B is a diagrammatic top view representation of the vehicle and system shown in FIG. 2A consistent with the disclosed embodiments.

FIG. 2A is a diagrammatic side view representation of a vehicle imaging system according to examples of the presently disclosed subject matter. FIG. 2B is a diagrammatic top view illustration of the example shown in FIG. 2A. As illustrated in FIG. 2B, the disclosed examples can include a vehicle 200 including in its body a system 100 with a first image capture device 122 positioned in the vicinity of the rearview mirror and/or near the driver of vehicle 200, a second image capture device 124 positioned on or in a bumper region (e.g., one of bumper regions 210) of vehicle 200, and a processing unit 110.

Figure 2C:
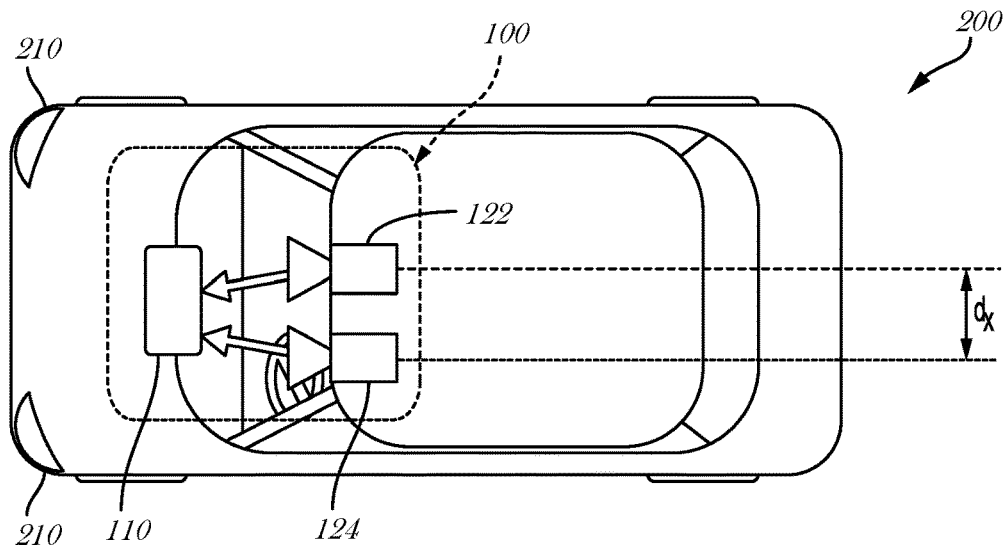
FIG. 2C is a diagrammatic top view representation of another embodiment of a vehicle including a system consistent with the disclosed embodiments.

As illustrated in FIG. 2C, image capture devices 122 and 124 may both be positioned in the vicinity of the rearview mirror and/or near the driver of vehicle 200. Additionally, while two image capture devices 122 and 124 are shown in FIGS. 2B and 2C, it should be understood that other embodiments may include more than two image capture devices. For example, in the embodiment shown in FIG. 2D, first, second, and third image capture devices 122, 124, and 126, are included in the system 100 of vehicle 200.

Figure 2D:
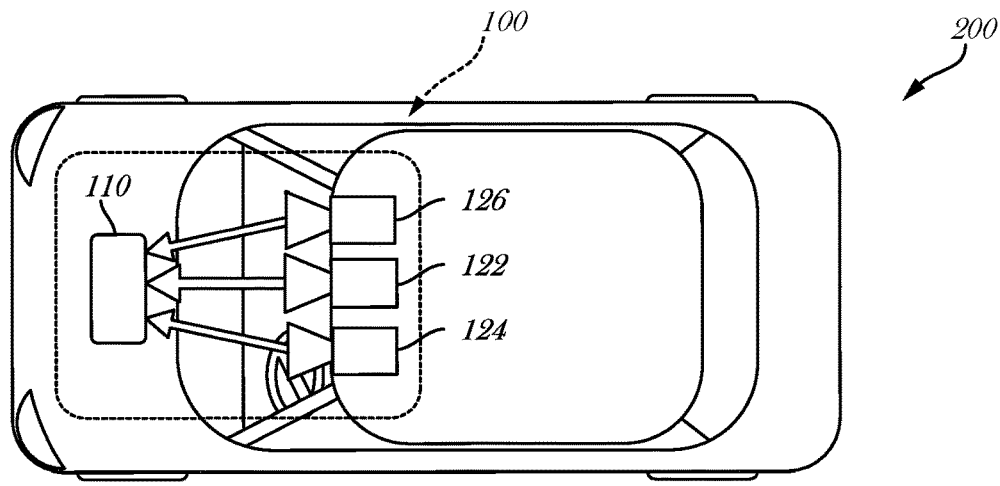
FIG. 2D is a diagrammatic top view representation of yet another embodiment of a vehicle including a system consistent with the disclosed embodiments.

As shown in FIG. 2D, image capture devices 122, 124, and 126 may be positioned in the vicinity of the rearview mirror and/or near the driver seat of vehicle 200. The disclosed examples are not limited to any particular number and configuration of the image capture devices, and the image capture devices may be positioned in any appropriate location within and/or on vehicle 200.

It is also to be understood that disclosed embodiments are not limited to a particular type of vehicle 200 and may be applicable to all types of vehicles including automobiles, trucks, trailers, motorcycles, bicycles, self-balancing transport devices and other types of vehicles.

The first image capture device 122 can include any suitable type of image capture device. Image capture device 122 can include an optical axis. In one instance, the image capture device 122 can include an Aptina M9V024 WVGA sensor with a global shutter. In another example, a rolling shutter sensor can be used. Image acquisition unit 120, and any image capture device which is implemented as part of the image acquisition unit 120, can have any desired image resolution. For example, image capture device 122 can provide a resolution of 1280×960 pixels and can include a rolling shutter.

Image acquisition unit 120, and any image capture device which is implemented as part of the image acquisition unit 120, can include various optical elements. In some embodiments one or more lenses can be included, for example, to provide a desired focal length and field of view for the image acquisition unit 120, and for any image capture device which is implemented as part of the image acquisition unit 120. In some examples, an image capture device which is implemented as part of the image acquisition unit 120 can include or be associated with any optical elements, such as a 6 mm lens or a 12 mm lens, for example. In some examples, image capture device 122 can be configured to capture images having a desired (and known) field-of-view (FOV).

The first image capture device 122 may have a scan rate associated with acquisition of each of the first series of image scan lines. The scan rate may refer to a rate at which an image sensor can acquire image data associated with each pixel included in a particular scan line.

Figure 2E:
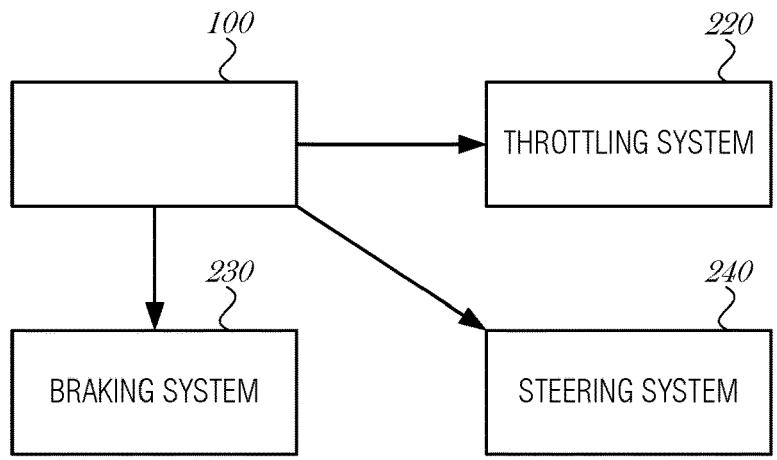
FIG. 2E is a diagrammatic representation of exemplary vehicle control systems consistent with the disclosed embodiments.

FIG. 2E is a diagrammatic representation of vehicle control systems, according to examples of the presently disclosed subject matter. As indicated in FIG. 2E, vehicle 200 can include throttling system 220, braking system 230, and steering system 240. System 100 can provide inputs (e.g., control signals) to one or more of throttling system 220, braking system 230, and steering system 240 over one or more data links (e.g., any wired and/or wireless link or links for transmitting data). For example, based on analysis of images acquired by image capture devices 122, 124, and/or 126, system 100 can provide control signals to one or more of throttling system 220, braking system 230, and steering system 240 to navigate vehicle 200 (e.g., by causing an acceleration, a turn, a lane shift, etc.). Further, system 100 can receive inputs from one or more of throttling system 220, braking system 230, and steering system 240 indicating operating conditions of vehicle 200 (e.g., speed, whether vehicle 200 is braking and/or turning, etc.).

Figure 3:
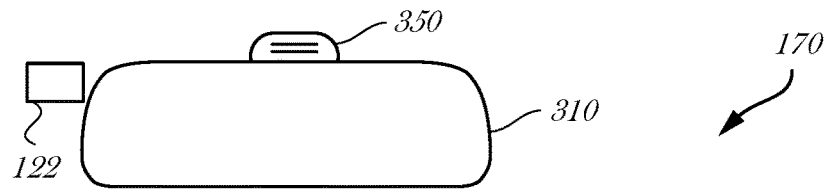
FIG. 3 is a diagrammatic representation of an interior of a vehicle including a rearview mirror and a user interface for a vehicle imaging system consistent with the disclosed embodiments.
Figure 3:
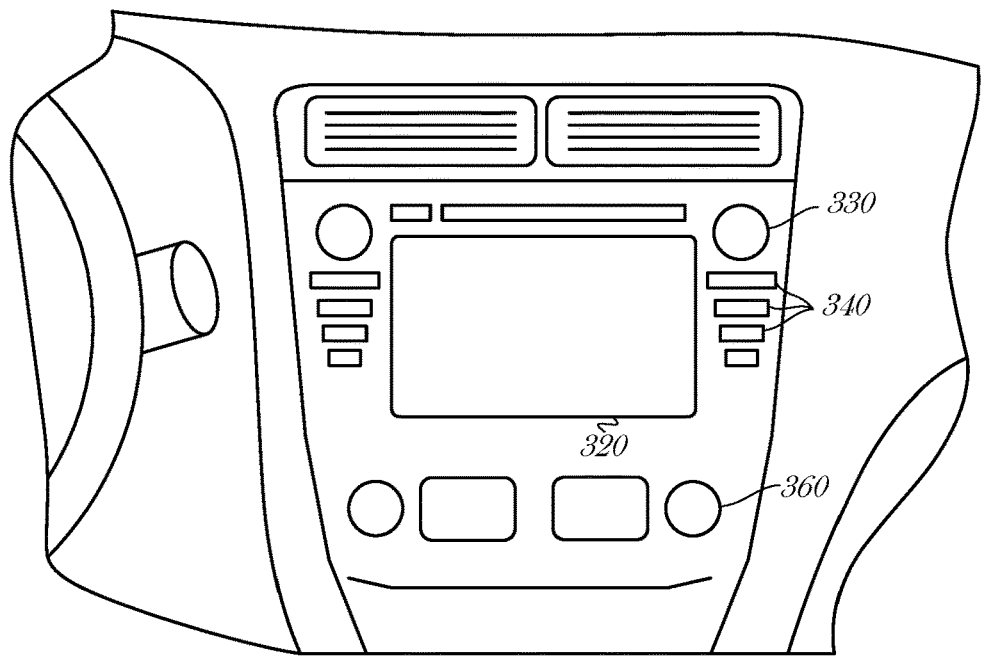

As shown in FIG. 3, the vehicle may also include a user interface 170 for interacting with a driver or a passenger of vehicle. For example, user interface 170 in a vehicle application may include a touch screen 320, knobs 330, buttons 340, and a microphone 350. A driver or passenger of the vehicle may also use handles (e.g., located on or near the steering column of the vehicle including, for example, turn signal handles), buttons (e.g., located on the steering wheel of the vehicle), and the like, to interact with system 100. In some embodiments, microphone 350 may be positioned adjacent to a rearview mirror 310. Similarly, in some embodiments, image capture device 122 may be located near rearview mirror 310. In some embodiments, user interface 170 may also include one or more speakers 360 (e.g., speakers of a vehicle audio system). For example, system 100 may provide various notifications (e.g., alerts) via speakers 360.

As will be appreciated by a person skilled in the art having the benefit of this disclosure, numerous variations and/or modifications may be made to the foregoing disclosed embodiments. For example, not all components are essential for the operation of system 100. Further, any component may be located in any appropriate part of system 100 and the components may be rearranged into a variety of configurations while providing the functionality of the disclosed embodiments. Therefore, the foregoing configurations are examples and, regardless of the configurations discussed above, system 100 can provide a wide range of functionality to analyze the surroundings of the vehicle and, in response to this analysis, navigate and/or otherwise control and/or operate the vehicle. Navigation, control, and/or operation of the vehicle may include enabling and/or disabling (directly or via intermediary controllers, such as the controllers mentioned above) various features, components, devices, modes, systems, and/or subsystems associated with vehicle 200. Navigation, control, and/or operation may alternately or additionally include interaction with a user, driver, passenger, passerby, and/or other vehicle or user, which may be located inside or outside the vehicle, for example by providing visual, audio, haptic, and/or other sensory alerts and/or indications.

As discussed below in further detail and consistent with various disclosed embodiments, system 100 may provide a variety of features related to autonomous driving, semi-autonomous driving and/or driver assist technology. For example, system 100 may analyze image data, position data (e.g., GPS location information), map data, speed data, and/or data from sensors included in the vehicle. System 100 may collect the data for analysis from, for example, image acquisition unit 120, position sensor 130, and other sensors. Further, system 100 may analyze the collected data to determine whether or not the vehicle should take a certain action, and then automatically take the determined action without human intervention. It would be appreciated that in some cases, the actions taken automatically by the vehicle are under human supervision, and the ability of the human to intervene adjust abort or override the machine action is enabled under certain circumstances or at all times. For example, when vehicle 200 navigates without human intervention, system 100 may automatically control the braking, acceleration, and/or steering of the vehicle (e.g., by sending control signals to one or more of throttling system 220, braking system 230, and steering system 240). Further, system 100 may analyze the collected data and issue warnings, indications, recommendations, alerts, or instructions to a driver, passenger, user, or other person inside or outside of the vehicle (or to other vehicles) based on the analysis of the collected data. Additional details regarding the various embodiments that are provided by system 100 are provided below.

Compare and Exchange Operation

In computer science, compare and exchange is an atomic instruction used in multithreading to achieve synchronization. It compares the contents (stored value—Vstored) of a memory location with a given value (expected value—Vexpected) and, only if they are the same, modifies the contents of that memory location to a new value (desired value—Vdesired). This is done as a single atomic operation.

The atomicity guarantees that the new value is calculated based on up-to-date information. If the new value had been updated by another thread in the meantime, the write would fail.

The result of the operation must indicate whether it performed the substitution. This can be done either with a simple Boolean response (this variant is often called compare-and-set), or by returning the value read from the memory location (not the value written to it).

A compare and exchange operation includes more arguments than most other commands—the arguments include Vdesired, Vexpected, and the memory location of Vstored. Accordingly, when requested by a single command, it is very long, as the command includes an operand, an address of the memory location, Vexpected, and Vdesired.

Most commands are shorter than the compare and exchange operation and conveying such a long command to a processor will require wider buses to a processor, which may be highly inefficient.

There may be provided a method and a device that split the compare and exchange operation to a pair of commands: a compare command and a conditional exchange command. The pair of commands are executed in an atomic manner.

The compare command includes a compare operand, the address (memory location) of the stored value (Vstored), the expected value (Vexpected), and a thread identifier (TID) that identifies the thread that generated the compare command. The outcome of the compare command may be a comparison result such as a Boolean response (BR) indicating whether Vexpected equals Vstored.

The conditional exchange command includes a conditional exchange command operand, the address (memory location) of the stored value, the desired value (Vdesired), and the TID. The outcome of the conditional exchange command is the old value of the memory location (the value of the variable before the execution of the conditional exchange command).

The following text may refer to an atomic execution ALU. The atomic execution ALU is an ALU that may execute the compare command and the conditional exchange command in an atomic manner. One or more processing cores may belong to a single central processing unit or any other processing unit. The first controller is a component capable of controlling operations.

In order to guarantee the atomicity of the execution of the pair of commands, the pair of commands should be provided to an atomic execution arithmetic logic unit (ALU) (also referred to as an arithmetic logic circuit herein) without allowing any other command addressed to the same address to intervene and be executed between the execution of the compare command of the pair and the conditional exchange command of the pair.

In order to prevent such intervention, there is a provided a buffer for storing compare commands.

The pair of commands may be fed to an atomic execution ALU—one after the other or concurrently—without feeding any other command between the pair of commands.

When managing multiple threads, the conditional exchange command and the compare command are flagged with the thread that generated them.

There may be many threads, multiple cores that execute the multiple threads, and multiple atomic execution ALUs. This scenario may require maintaining multiple buffers.

A buffer may be large enough to store a compare command for each one of the many threads.

Alternatively, in order to reduce the area allocated to the buffers, a buffer may be capable of storing compare commands only for a subset of the many threads.

For example, assuming that there are 32 threads. The buffer may store only 4 or 8 compare commands. Thus, the buffer has 4 or 8 entries for storing up to 4 or 8 compare commands. It should be noted that 32, 8, and 4 are merely non-limiting examples of numerical values.

Thus, a buffer may store fewer compare commands than the number of threads. The number of compare commands may be 1/X of the number of threads, X may exceed one. For example, X may be 2, 2.5, 3, 3.33, 4, 5, 6, 7, 8, and the like.

When a buffer is capable of storing fewer compare commands than the number of threads then a buffer full failure may occur.

The full buffer failure is a type of a hardware failure and may occur when a compare command of a certain thread arrives, but the buffer is full of (previous) compare commands of other threads.

When a buffer full failure occurs, BR is set to indicate a failure.

This hardware failure should be distinguished from an execution of a compare and exchange operation where the comparison is successfully and fully executed.

The distinction is made based on the BR, Vexpected, and Vstored.

When BR is negative (indicating that a comparison was not made or that a comparison occurred and Vstored differs from Vexpected), then a comparison can be made between Vstored (outcome of the conditional exchange command) and the Vexpected.

Assuming that Vstored equals Vexpected, then in absence of a hardware failure, BR should be positive. A reception of a negative BR indicates that a hardware failure occurred.

When Vstored differs from Vexpected then it is irrelevant whether the comparison was made or not because in any case Vstored will not be replaced by Vdesired.

This is illustrated in the following table:

TABLE 1

| Buffer Failure (full) | Vstored = Vexpected? | BR-comparison result | Outcome of conditional exchange command | Content of memory location after executing conditional exchange command | Hardware failure |
| --- | --- | --- | --- | --- | --- |
| No | Yes | 1 | Vstored | Vdesired | No |
| No | No | 0 | Vstored | Vstored | No |
| Yes | Yes | 0 | Vstored | Vstored | Yes |
| Yes | No | 0 | Vstored | Vstored | Irrelevant |

If a buffer failure occurs, additional attempts to perform the compare and exchange command may be executed. For example, attempts may be made until the compare and exchange command succeeds, until a predefined number of failures occur, and the like. The processing core may decide to perform the additional attempts. The decision to perform the additional attempts may be determined by a writer of the kernel. For example, the writer of the kernel may decide that the processing core should keep trying until succeeding, or allocate the processing core to other tasks, and retry only later on, or performing any combinations of steps.

Thus, two types of compare and exchange commands may be executed: 1) a hard compare and exchange command—a compare and exchange command that is not allowed to fail (for example, exhibit a buffer full failure), and 2) a soft compare and exchange command—a compare and exchange command that is allowed to fail.

Each pair of a compare command and a conditional exchange command may be regarded as a soft compare and exchange command, and a repetition of the soft compare and exchange commands until success provides a hard compare and exchange command.

A pseudocode of a soft compare and exchange command may have the following form:

```
bool atomic_compare_exchange_weak(*ptrObj, *ptrVexpected,
Vdesired) {
    Vexpected = *ptrVexpected;
    bool res = atomic_cmpxchg1(Vexpected, ptrObj);
    old_val = atomic_cmpxchg2(Vdesired, ptrObj);
    *ptrVexpected = old_val;
    return res;
}
```

A pseudocode of a strong compare and exchange command may have the following form:

```
bool atomic_compare_exchange_strong(*ptrObj, *ptrVexpected,
Vdesired) {
    Vexpected = *ptrVexpected;
    while(!atomic_compare_exchange_weak(ptrObj, ptrVexpected,
Vdesired)) {
        if (Vexpected != *ptrVexpected)
        return false;
    }
    return true;
}
```

Figure 4:
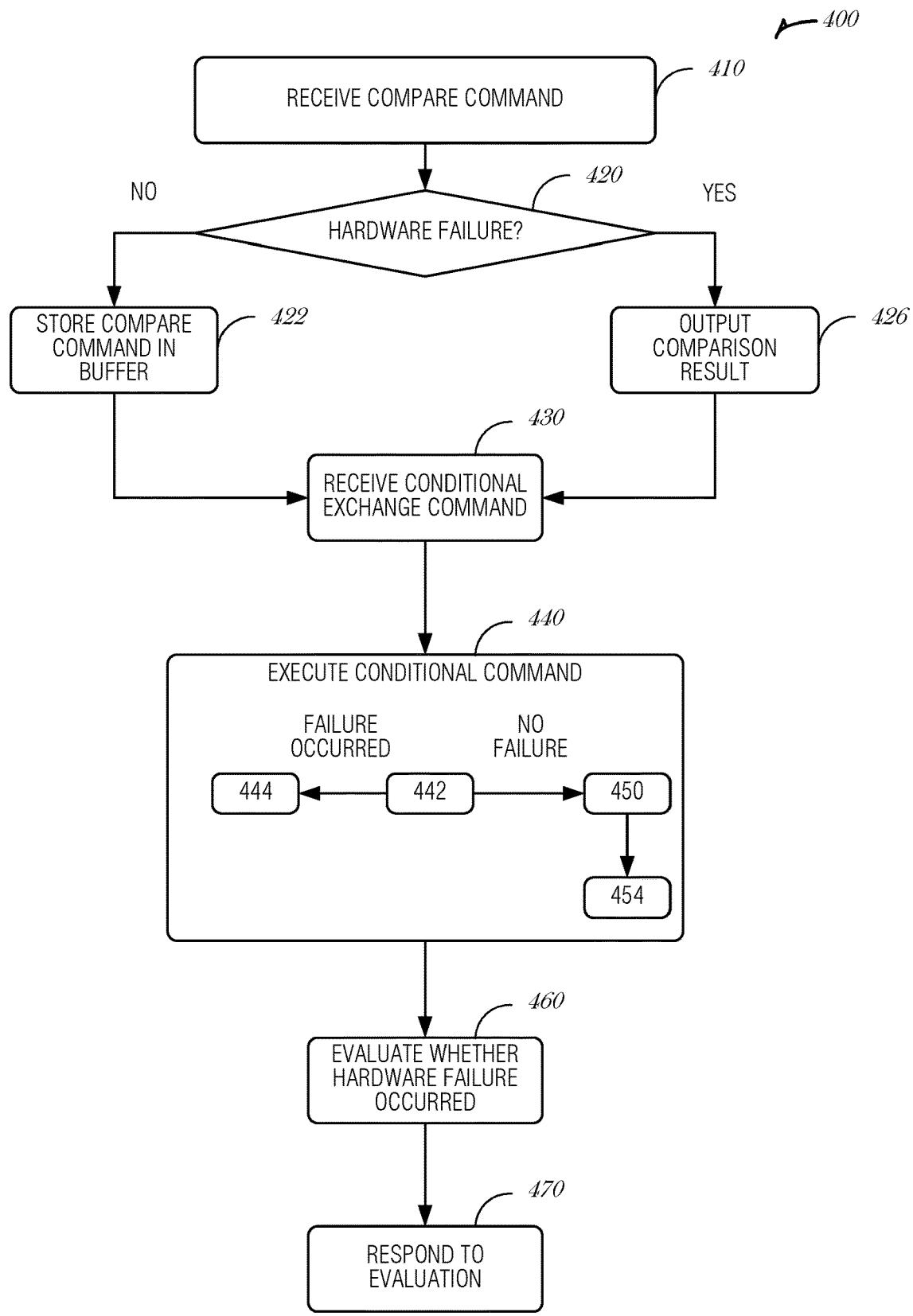
FIG. 4 illustrates an example of a method.

FIG. 4 illustrates a method 400 for executing a compare and exchange command.

Method 400 may start by step 410 of receiving a compare command. The compare command is for comparing a stored value to an expected value and outputting a comparison result that indicates whether the stored value equals the expected value or not. The compare command is associated with a thread that generated the compare command. The compare command may include or may be configured to invoke a data retrieval operation for retrieving the stored value from a memory location. The compare command may include an address, a pointer, and the like for which to retrieve the data. The compare command may include a thread identifier that identifies the thread which generated the command.

Step 410 may be followed by step 420 of determining whether an execution of the compare command causes a hardware failure.

A hardware failure may occur when, for example, the compare command cannot be buffered in a buffer—checking whether the buffer is full or not.

The compare command performs a comparison between a stored value (stored in a memory location) and the expected value. The memory location belongs to a range of memory locations. Compare exchange is typically used on memory regions which are shared between a few computing elements or accelerators. But in the general case, the range of memory locations can be any memory range.

The buffer that is checked to determine if it is full is a buffer that is associated with the memory location and is the buffer which is allocated for the range of memory addresses. The allocation of the memory addresses per buffer may be fixed or dynamic. An example of a fixed allocation may include allocating (in a fixed manner) one buffer per each memory bank.

When a hardware failure did not occur (for example, the buffer is not full) then step 420 is followed by step 422 of storing the compare command in the buffer.

When a hardware failure occurred (for example, the buffer is full) then step 422 may be followed by step 426 of outputting a comparison result indicative that the stored value differs from the expected value.

It should be noted that the comparison result is generated regardless of the relationship between the stored value and the expected value.

Method 400 may also include step 430 of receiving (directly or indirectly from a processing core), a conditional exchange command. The conditional exchange command is for replacing the stored value (in the memory location) by a desired value when the outcome of the compare command indicates that the stored value equals the expected value.

The outcome of the conditional exchange command is a conditional exchange, but the updated value stored in the memory location (after the execution of the conditional exchange command) is not outputted. The outcome of the execution of the conditional exchange command that is provided as an output is the stored value. The stored value being the value stored at the memory location before the execution of the conditional exchange command.

The conditional exchange command is associated with a thread that generated the conditional exchange command. The conditional exchange command may include a thread identifier.

Step 430 may be followed by step 440 of executing the conditional exchange command based on the outcome of the determining operation.

Step 440 may include steps 442, 444, 450 and 454.

Step 442 may include searching in the buffer for a compare command that is associated with the same thread as the conditional exchange command.

If such a compare command is not found, then step 442 is followed by step 444 of executing the conditional exchange command based on the assumption that the stored value differs from the expected value.

The assumption may reflect the real relationship between stored value and the expected value. When a hardware failure occurs, the assumption reflects the occurrence of the hardware failure and does not necessarily reflect the relationship between the stored value and the expected value. For example, when a hardware failure occurs the comparison result indicates that the stored value differs from the expected value, even when the stored value equals the expected value.

Step 444 may include not exchanging the stored value with the desired value but returning the stored value as an outcome of the execution of the conditional exchange command.

Step 444 may include sending only the conditional exchange command to the atomic execution arithmetic logic unit (ALU). The atomic execution ALU may infer, from receiving the conditional exchange command (without the compare command), that the stored value is assumed to be different than the expected value. The atomic execution ALU may receive any other indication that the stored value is assumed to be different than the expected value.

If such a compare command is found, then step 442 is followed by step 450 of feeding the compare command and the conditional exchange command to an atomic execution arithmetic logic unit (ALU) so that the first and conditional exchange commands are executed in an atomic manner.

Step 450 may be followed by step 454 of executing the compare command and the conditional exchange command in an atomic manner by the atomic execution ALU and provide an outcome. The outcome is the stored value and also a result of the compare command.

Step 454 may be followed by step 460 of evaluating by the processing core, whether the hardware failure occurred based on a comparison between the stored value and the expected value. Step 460 may be executed by the entity that generated the compare command and the conditional exchange command. Step 460 may be executed by an entity that is not aware whether the comparison result reflects a buffer failure or reflects the true relationship between the stored value and the expected value.

Step 460 may be followed by step 470 of responding to the evaluation. In an example, step 470 initiates repeating steps 410-460 when the hardware failure occurred.

The repetitions may be performed until a stop condition is fulfilled. For example, the stop condition may include reaching a predefined number of iterations. In another example, the repetitions may be performed until the processing core is able to execute the atomic compare exchange operation without a hardware failure.

Figure 5:
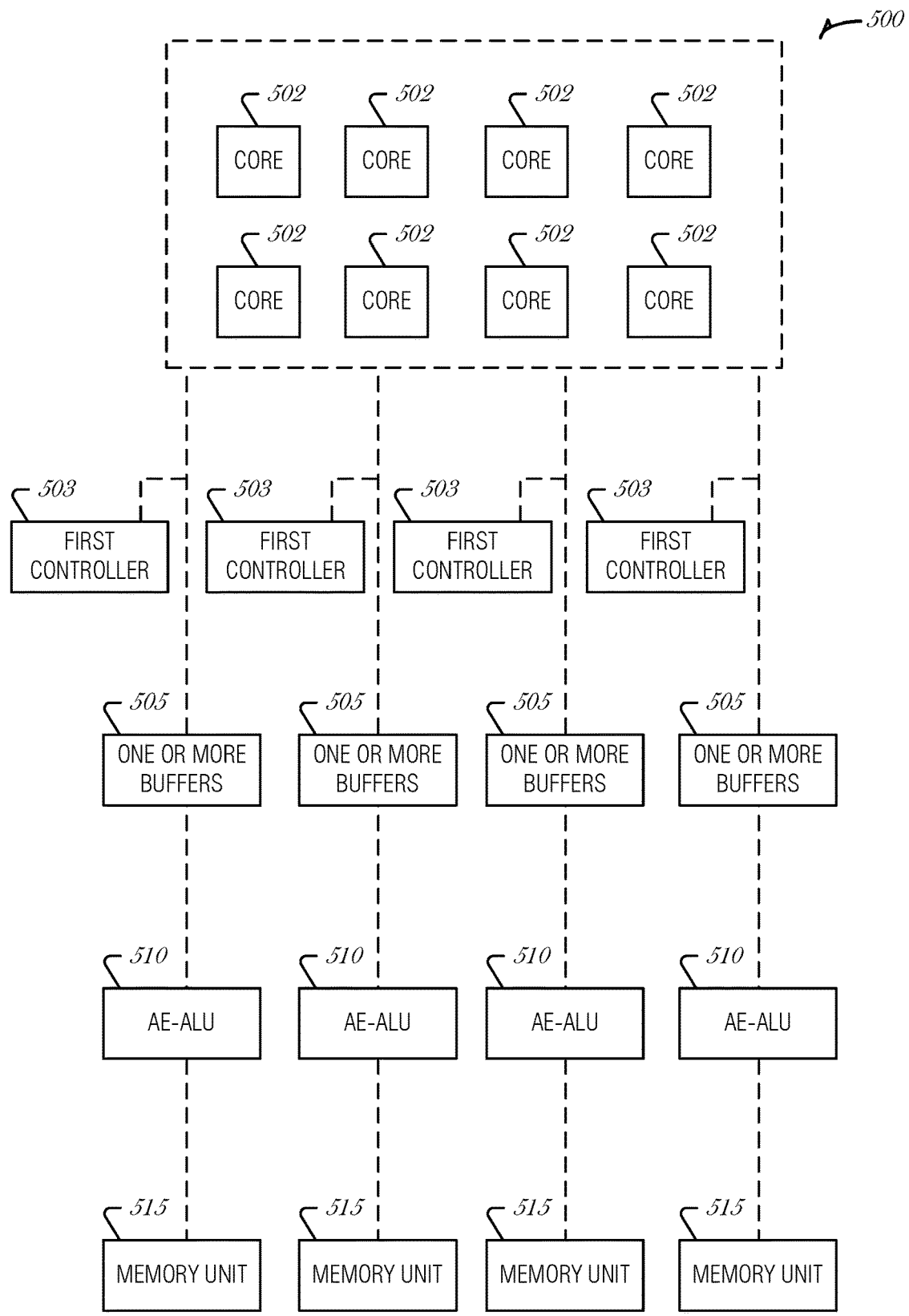
FIG. 5 illustrates an example of a device.

FIG. 5 illustrates an example of a device 500. The device 500 may be a part of processing unit 110 of system 100 or may not be a part of processing unit 110. Alternatively, device 500 may not be related to a vehicle, may be accessed by units that do not preform image processing and/or do not assist in driving and/or do not perform autonomous driving.

The device 500 may include one or more cores (computational cores) 502, that may execute multiple threads.

Device 500 is illustrated as including atomic execution arithmetic logic units (ALUs) (denoted AE-ALU 510), first controllers 503, multiple groups of one or more buffers 505, and memory units 515. The memory units 515 may be cache memories. The atomic execution ALUs 510 may be included in the memory units 515, for example, as a part of a cache block. The atomic execution ALUs 510 may be located in proximity to the memory units 515. There may be one or more atomic execution ALUs 510 per memory unit 515.

It is assumed that a single memory unit 515 is associated with an AE-ALU 510, a group of one or more buffers 505, and a first controller 503.

Device 500 may be configured to receive a compare command, the compare command is for (a) comparing an expected value to a stored value, the stored value is stored in a memory location, and (b) outputting a comparison result that indicates whether the stored value equals the expected value, wherein the compare command is associated with a conditional exchange command, wherein the compare command and the conditional exchange command are associated with a common thread.

A first controller 503 is configured to determine whether an execution of the compare command causes a hardware failure.

When determining that the execution of the compare command does not cause the hardware failure, then the atomic execution ALU 510 is configured to receive and execute the compare command and the conditional exchange command in an atomic manner.

When determining that the execution of the compare result causes the hardware failure then (a) the first controller 503 is configured to generate a comparison result that indicates that the stored value differs from an expected value, (b) the atomic execution ALU 510 is configured to execute the conditional exchange command based on an assumption that the stored value differs from an expected value, wherein the executing of the conditional exchange command comprises outputting the stored value, the stored value reflects a content of the memory location before the execution of the conditional exchange command.

Alternatively, upon a hardware failure, the ALU 510 does not need to execute the conditional exchange command, and the first controller merely reads the stored value from the memory location.

The processing core is configured to receive the stored value and evaluate whether the hardware failure occurred based on a comparison between the stored value and the expected value.

Any of the mentioned above memory or storage units may be implemented using any known technologies such as a volatile or nonvolatile memory including semiconductor-based memory units such as flash memory, EEPROM, EPROM, ROM; ferromagnetic digital memories; MRAM; volatile storage media including registers, buffers or caches, main memory, RAM, DRAM, SRAM, etc.

For example, any of method describing steps may include more steps than those illustrated in the figure, only the steps illustrated in the figure or substantially only the steps illustrated in the figure. The same applies to components of a device, processor, or system and to instructions stored in any non-transitory computer readable storage medium.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as flash memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input and responds by allocating and managing tasks and internal system resources as a service to users and programs of the system.

The computer system may for instance include at least one processing unit, associated memory, and a number of input/output (I/O) devices. When executing the computer program, the computer system processes information according to the computer program and produces resultant output information via I/O devices.

EXAMPLES

Example 1 is a device comprising: an atomic execution algorithm logic unit (ALU); a processing core; and a first controller; wherein the processing core is configured to send to the first controller a compare command, the compare command configured for (a) comparing an expected value to a stored value, the stored value is stored in a memory location, and (b) outputting a comparison result that indicates whether the stored value equals the expected value, wherein the compare command is associated with a conditional exchange command, wherein the compare command and the conditional exchange command are associated with a same thread; wherein the first controller is configured to determine whether an execution of the compare command causes a hardware failure; when determining that the execution of the compare command does not cause the hardware failure then the atomic execution ALU is configured to receive and execute the compare command and the conditional exchange command in an atomic manner; and when determining that the execution of the compare result causes the hardware failure then: (a) the first controller is configured to generate a comparison result that indicates that the stored value differs from an expected value; (b) the atomic execution ALU is configured to execute the conditional exchange command based on an assumption that the stored value differs from an expected value, wherein the executing of the conditional exchange command comprises outputting the stored value, wherein the stored value reflects a content of the memory location before the execution of the conditional exchange command; and (c) the processing core is configured to receive the stored value and evaluate whether the hardware failure occurred based on a comparison between the stored value and the expected value.

In Example 2, the subject matter of Example 1 includes, wherein the atomic execution ALU is configured to execute the compare command following a determination that the execution of the compare command does not cause the hardware failure.

In Example 3, the subject matter of Examples 1-2 includes, wherein the first controller is configured to execute the conditional exchange command without using the atomic execution ALU when determining that the execution of the compare result causes the hardware failure.

In Example 4, the subject matter of Examples 1-3 includes, wherein the atomic execution ALU is configured to execute the compare command based on an assumption that the stored value differs from the expected value when determining that the execution of the compare result causes the hardware failure.

In Example 5, the subject matter of Examples 1-4 includes, wherein the atomic execution ALU is configured to execute the conditional exchange command, and wherein the first controller is configured to perform the determining by checking whether the compare command can be stored in a buffer allocated to the atomic execution ALU.

In Example 6, the subject matter of Example 5 includes, wherein the processing core is configured to determine that the hardware failure occurred when the (a) stored value equals a desired value, and (b) the comparison result indicates that the stored value differs from the expected value.

In Example 7, the subject matter of Examples 5-6 includes, wherein the first controller is configured to send the compare command and the conditional exchange command to the atomic execution ALU when determining that the hardware failure did not occur, without sending any other command to be executed between an execution of the compare command and an execution of the conditional exchange command.

In Example 8, the subject matter of Examples 5-7 includes, wherein the first controller is configured to send the conditional exchange command to the atomic execution ALU, without sending the compare command when determining that the hardware failure did occur.

In Example 9, the subject matter of Examples 5-8 includes, wherein the first controller is configured to send only a conditional exchange command to the atomic execution ALU when the hardware failure occurred and to send to the atomic execution ALU a compare command and an associated conditional exchange command when the hardware failure did not occur.

In Example 10, the subject matter of Examples 1-9 includes, wherein the device is configured to perform at least one more iteration of an execution of an atomic compare exchange operation, following an evaluating that the hardware failure occurred.

In Example 11, the subject matter of Examples 1-10 includes, wherein the memory location belongs to a cache memory.

Example 12 is a method for executing an atomic compare exchange operation, the method comprising: receiving, from a processing core, a compare command, the compare command configured for (a) comparing an expected value to a stored value, the stored value stored in a memory location, and (b) outputting a comparison result that indicates whether the stored value equals the expected value, wherein the compare command is associated with a conditional exchange command, wherein the compare command and the conditional exchange command are associated with a same thread; determining, by a first controller, whether an execution of the compare command causes a hardware failure; when determining that the execution of the compare command does not cause the hardware failure then executing the compare command and the conditional exchange command in an atomic manner; when determining that the execution of the compare result causes the hardware failure then (a) generating a comparison result that indicates that the stored value differs from the expected value; and (b) executing the conditional exchange command based on an assumption that the stored value differs from the expected value, wherein the executing of the conditional exchange command comprises outputting the stored value, wherein the stored value reflects a content of the memory location before the execution of the conditional exchange command; receiving, by the processing core, the stored value; and evaluating, by the processing core, whether the hardware failure occurred based on a comparison between the stored value and the expected value.

In Example 13, the subject matter of Example 12 includes, wherein executing the conditional exchange command in an atomic manner when determining that the execution of the compare command does not cause the hardware failure is performed by an atomic execution arithmetic logic circuit (ALU).

In Example 14, the subject matter of Example 13 includes, wherein executing the conditional exchange command when determining that the execution of the compare result causes the hardware failure is performed without involving the atomic execution ALU.

In Example 15, the subject matter of Examples 13-14 includes, wherein the outputting of the stored value when determining that the execution of the compare result causes the hardware failure is preceded by executing the conditional exchange command by the atomic execution ALU.

In Example 16, the subject matter of Examples 12-15 includes, executing the conditional exchange command by an atomic execution arithmetic logic circuit (ALU), wherein the determining that the execution of the compare command does not cause the hardware failure comprises checking whether the compare command can be stored in a buffer allocated to the atomic execution ALU.

In Example 17, the subject matter of Example 16 includes, determining that the hardware failure occurred when the stored value equals a desired value, and the comparison result indicates that the stored value differs from the expected value.

In Example 18, the subject matter of Examples 16-17 includes, sending the compare command and the conditional exchange command to the atomic execution ALU when determining that the hardware failure did not occur, without sending any other command to be executed between an execution of the compare command and an execution of the conditional exchange command.

In Example 19, the subject matter of Examples 16-18 includes, sending the conditional exchange command to the atomic execution ALU, without sending the compare command when determining that the hardware failure did occur.

In Example 20, the subject matter of Examples 16-19 includes, sending only a conditional exchange command to the atomic execution ALU when the hardware failure occurred and sending to the atomic execution ALU a compare command and an associated conditional exchange command when the hardware failure did not occur.

In Example 21, the subject matter of Examples 12-20 includes, performing at least one more iteration of an execution of the atomic compare exchange operation, following an evaluating that the hardware failure occurred.

In Example 22, the subject matter of Examples 12-21 includes, wherein the memory location belongs to a cache memory.

Example 23 is at least one machine-readable medium including instructions that, when executed by processing circuitry, cause the processing circuitry to perform operations to implement of any of Examples 1-22.

Example 24 is an apparatus comprising means to implement of any of Examples 1-22.

Example 25 is a system to implement of any of Examples 1-22.

Example 26 is a method to implement of any of Examples 1-22.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units, or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also, for example, in an embodiment, the illustrated examples may be implemented as circuitry located on a single integrated circuit or within a same device. Alternatively, the examples may be implemented as any number of separate integrated circuits or separate devices interconnected with each other in a suitable manner.

Also, for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A device comprising:
a hardware atomic execution arithmetic logic circuit (ALU);
a processing core; and
a first controller electronically coupled to the processing core and the atomic execution ALU, to form a memory operation pipeline;
wherein the processing core is configured to send to the first controller a compare command, the compare command configured for (a) comparing an expected value to a stored value, the stored value is stored in a memory location, and (b) outputting a comparison result that indicates whether the stored value equals the expected value, wherein the compare command is associated with a conditional exchange command, wherein the compare command and the conditional exchange command are associated with a same thread, wherein the expected value is a last value written to the memory location by the thread, wherein the expected value differs from the stored value when another thread wrote to the memory location a value that differs from the expected value following a writing of the last value by the thread;
wherein the first controller is configured to determine whether an execution of the compare command causes a hardware failure;
when determining that the execution of the compare command does not cause the hardware failure then the atomic execution ALU is configured to receive and execute the compare command and the conditional exchange command in an atomic manner, the conditional exchange command to update the stored value in the memory location with a desired value when there is no hardware failure determined by the first controller; and
when determining that the execution of the compare command causes the hardware failure then:
(a) the first controller is configured to generate a comparison result that indicates that the stored value differs from the expected value, even when the stored value is the same as the expected value; and
(b) the atomic execution ALU is configured to execute the conditional exchange command as if the stored value differs from an expected value, wherein the executing of the conditional exchange command comprises outputting the stored value, wherein the stored value is the contents of the memory location before the execution of the conditional exchange command; and
wherein the processing core is configured to receive the stored value and evaluate whether the hardware failure occurred based on a comparison between the stored value and the expected value.

2. The device according to claim 1, wherein the atomic execution ALU is configured to execute the compare command following a determination that the execution of the compare command does not cause the hardware failure.

3. The device according to claim 1, wherein the atomic execution ALU is configured to execute the conditional exchange command as if the stored value differs from the expected value when determining that the execution of the compare command causes the hardware failure.

4. The device according to claim 1, wherein the atomic execution ALU is configured to execute the conditional exchange command, wherein the first controller is configured to perform the determining by checking whether the compare command can be stored in a buffer allocated to the atomic execution ALU, wherein the execution of the compare command causes the hardware failure when the buffer is currently full with compare commands written by other threads and the compare command cannot be stored in the buffer.

5. The device according to claim 4, wherein the processing core is configured to determine that the hardware failure occurred when the (a) stored value equals a desired value, and (b) the comparison result indicates that the stored value differs from the expected value.

6. The device according to claim 4, wherein the first controller is configured to send the compare command and the conditional exchange command to the atomic execution ALU when determining that the hardware failure did not occur, without sending any other command to be executed between an execution of the compare command and an execution of the conditional exchange command.

7. The device according to claim 4, wherein the first controller is configured to send the conditional exchange command to the atomic execution ALU, without sending the compare command when determining that the hardware failure did occur.

8. The device according to claim 4, wherein the first controller is configured to send only a conditional exchange command to the atomic execution ALU when the hardware failure occurred and to send to the atomic execution ALU a compare command and an associated conditional exchange command when the hardware failure did not occur.

9. The device according to claim 1, wherein the device is configured to perform at least one more iteration of an execution of an atomic compare exchange operation, following an evaluating that the hardware failure occurred.

10. The device according to claim 1, wherein the memory location belongs to a cache memory.

11. A method for executing an atomic compare exchange operation, the method comprising:
receiving, at a first controller from a processing core, a compare command, the compare command configured for (a) comparing an expected value to a stored value, the stored value stored in a memory location, and (b) outputting a comparison result that indicates whether the stored value equals the expected value, wherein the compare command is associated with a conditional exchange command, wherein the compare command and the conditional exchange command are associated with a same thread, wherein the expected value is a last value written to the memory location by the thread, wherein the expected value differs from the stored value when another thread wrote to the memory location a value that differs from the expected value following a writing of the last value by the thread;
determining, by the first controller, whether an execution of the compare command causes a hardware failure, the first controller electronically coupled to the processing core and a hardware atomic execution arithmetic logic circuit (ALU), to form a memory operation pipeline;
when determining that the execution of the compare command does not cause the hardware failure then executing the compare command and the conditional exchange command in an atomic manner, the conditional exchange command to update the stored value in the memory location with a desired value when there is no hardware failure determined by the first controller;
when determining that the execution of the compare command causes the hardware failure then:

(a) generating a comparison result that indicates that the stored value differs from the expected value, even when the stored value is the same as the expected value; and (b) executing the conditional exchange command as if the stored value differs from the expected value, wherein the executing of the conditional exchange command comprises outputting the stored value, wherein the stored value is the current contents of the memory location before the execution of the conditional exchange command;

receiving, by the processing core, the stored value; and evaluating, by the processing core, whether the hardware failure occurred based on a comparison between the stored value and the expected value.

12. The method according to claim 11, wherein executing the conditional exchange command in an atomic manner when determining that the execution of the compare command does not cause the hardware failure is performed by the atomic execution arithmetic logic circuit (ALU).

13. The method according to claim 12, wherein the outputting of the stored value when determining that the execution of the compare command causes the hardware failure is preceded by executing the conditional exchange command by the atomic execution ALU.

14. The method according to claim 11, comprising executing the conditional exchange command by an atomic execution arithmetic logic circuit (ALU), wherein the determining that the execution of the compare command does not cause the hardware failure comprises checking whether the compare command can be stored in a buffer allocated to the atomic execution ALU, wherein the execution of the compare command causes the hardware failure when the buffer is currently full with compare commands written by other threads and the compare command cannot be stored in the buffer.

15. The method according to claim 14, comprising determining that the hardware failure occurred when the stored value equals a desired value, and the comparison result indicates that the stored value differs from the expected value.

16. The method according to claim 14, comprising sending the compare command and the conditional exchange command to the atomic execution ALU when determining that the hardware failure did not occur, without sending any other command to be executed between an execution of the compare command and an execution of the conditional exchange command.

17. The method according to claim 14, comprising sending the conditional exchange command to the atomic execution ALU, without sending the compare command when determining that the hardware failure did occur.

18. The method according to claim 14, comprising sending only a conditional exchange command to the atomic execution ALU when the hardware failure occurred and sending to the atomic execution ALU a compare command and an associated conditional exchange command when the hardware failure did not occur.

19. The method according to claim 11, comprising performing at least one more iteration of an execution of the atomic compare exchange operation, following an evaluating that the hardware failure occurred.

20. The method according to claim 11, wherein the memory location belongs to a cache memory.

21. At least one non-transitory machine-readable medium including instructions for executing an atomic compare exchange operation, which when executed by a machine, cause the machine to perform operations comprising:

receiving, from a processing core, a compare command, the compare command configured for (a) comparing an expected value to a stored value, the stored value stored in a memory location, and (b) outputting a comparison result that indicates whether the stored value equals the expected value, wherein the compare command is associated with a conditional exchange command, wherein the compare command and the conditional exchange command are associated with a same thread, wherein the expected value is a last value written to the memory location by the thread, wherein the expected value differs from the stored value when another thread wrote to the memory location a value that differs from the expected value following a writing of the last value by the thread;

determining, by a first controller, whether an execution of the compare command causes a hardware failure, the first controller electronically coupled to the processing core and a hardware atomic execution arithmetic logic circuit (ALU), to form a memory operation pipeline;

when determining that the execution of the compare command does not cause the hardware failure then executing the compare command and the conditional exchange command in an atomic manner, the conditional exchange command to update the stored value in the memory location with a desired value when there is no hardware failure determined by the first controller; and when determining that the execution of the compare result causes the hardware failure then:

(a) generating a comparison result that indicates that the stored value differs from the expected value, even when the stored value is the same as the expected value; and (b) executing the conditional exchange command as if the stored value differs from the expected value, wherein the executing of the conditional exchange command comprises outputting the stored value, wherein the stored value is the current contents of the memory location before the execution of the conditional exchange command;

receiving, by the processing core, the stored value; and evaluating, by the processing core, whether the hardware failure occurred based on a comparison between the stored value and the expected value.

22. The at least one non-transitory machine-readable medium of claim 21, comprising instructions, which when executed by the machine, cause the machine to perform operations comprising:

executing the conditional exchange command by the atomic execution arithmetic logic circuit (ALU), wherein the determining that the execution of the compare command does not cause the hardware failure comprises checking whether the compare command can be stored in a buffer allocated to the atomic execution ALU.

* * * * *